United States Patent
Xavier et al.

(10) Patent No.: US 9,405,756 B1
(45) Date of Patent: Aug. 2, 2016

(54) CLOUD-BASED POINT-IN-TIME RESTORE OF COMPUTER DATA

(75) Inventors: Jijo M. Xavier, Milpitas, CA (US); Bobby Chien, San Jose, CA (US)

(73) Assignee: Trend Micro Incorporated, Tokyo (JP)

( * ) Notice: Subject to any disclaimer, the term of this patent is extended or adjusted under 35 U.S.C. 154(b) by 837 days.

(21) Appl. No.: 13/289,411

(22) Filed: Nov. 4, 2011

(51) Int. Cl.
  *G06F 17/00* (2006.01)
  *G06F 17/30* (2006.01)
  *G06F 11/14* (2006.01)

(52) U.S. Cl.
  CPC ...... *G06F 17/30088* (2013.01); *G06F 11/1446* (2013.01)

(58) Field of Classification Search
  USPC .......................................... 707/822; 380/28
  See application file for complete search history.

(56) References Cited

U.S. PATENT DOCUMENTS

2010/0191783 A1* 7/2010 Mason et al. ................. 707/822
2012/0134491 A1* 5/2012 Liu ................................ 380/28

OTHER PUBLICATIONS

Speed Up My PC / DoubleMySpeed.Com—Official Site, 1 sheet [retrieved on Oct. 22, 2011], retrieved from the internet: http://www.doublemyspeed.com/home.html?ref=DoubleMySpeed.com.
Norton Ghost—Backup and Restore Software—Official US Store, 1 sheet [retrieved on Oct. 22, 2011], retrieved from the internet: http://antivirus.norton.com/norton/ps/1up_us-en_gh.html?om_sem_cid.
Trend Micro SafeSync Download and install Trend Micro SafeSync, 1 sheet [retrieved on Oct. 19, 2011], retrieved from the internet: https://www.safesync.com/Pages/Welcome.
Protect, access & share your digital life, SafeSync—Trend Micro, 2 sheets [retrieved on Oct. 19, 2011], retrieved from the internet: http://emea.trendmicro.com/emea/products/personal/safesync-solution/.
Trend Micro SafeSync online data backup service (50GB)—reviews—Software and Services—Utilities, 3 sheets [retrieved on Oct. 19, 2011], retrieved from the internet: http://www.pcworld.idg.com.au/review/software_and_services/trend . . . .
Block (data storage)—Wikipedia, the free encyclopedia, 1 sheet [retrieved on Oct. 14, 2011], retrieved from the internet: http://en.wikipedia.org/wiki/Block_(data_storage).
What is System Restore?, Windows Vista, 1 sheet [retrieved on Oct. 19, 2011], retrieved from the internet: http://windows.microsoft.com/en-US/windows-vista/What-is-System . . . .
Volume (computing)—Wikipedia, the free encyclopedia, 4 sheets [retrieved on Oct. 20, 2011], retrieved from the internet: http://en.wikipedia.org/wiki/Volume_(computing).

* cited by examiner

*Primary Examiner* — Ann J Lo
(74) *Attorney, Agent, or Firm* — Okamoto & Benedicto LLP

(57) ABSTRACT

A backup and restore module allows for block level cloud-based back up and restore of a storage volume of a computer. Original content of a block of a disk volume that is being modified by a write operation is stored in a point-in-time snapshot in a cloud storage. The original content may be stored in a hidden volume in the computer prior to being stored in the cloud storage. The original content may be encrypted for storage. To roll back the computer by restoring the disk volume, the snapshot is retrieved from the cloud storage. The original content is copied from the snapshot back to the block to restore the disk volume. The hidden volume may be searched for other original contents yet to be included in the snapshot in the cloud storage, and the original contents may be copied back to corresponding blocks to restore the disk volume.

9 Claims, 5 Drawing Sheets

CLOUD-BASED POINT-IN-TIME RESTORE OF COMPUTER DATA

BACKGROUND OF THE INVENTION

1. Field of the Invention

The present invention relates to systems and methods for backing up and restoring computer data.

2. Description of the Background Art

Computer users, especially home computer users, install all sorts of software on their computers. As the number of software on a computer increases, so is the tendency of the computer to slow down. This slow down is prevalent with computers running the Microsoft Windows™ operating system, for example. There are commercially-available products for speeding up a computer, but most of them simply clean up the registry and bring the computer back to a reasonable configuration. Reinstalling the operating system is a reliable way of rolling back the computer to a previous, faster configuration but is not an easy procedure for typical home computer users.

SUMMARY

In one embodiment, a method of restoring computer data includes receiving original contents of blocks of a storage volume that have been modified by a write operation in a computer. The original contents are stored in a hidden volume of a data storage device in the computer. It is determined whether or not communication can be established with a remotely located cloud storage. In response to detecting that communication can be established with the cloud storage, the original contents are provided from the computer to the cloud storage. A command to roll back the computer to a previous configuration is received. In response to receiving the command to roll back the computer, the original contents are received from the cloud storage device and into the computer over the Internet. The original contents are written back to corresponding blocks in the storage volume.

In another embodiment, a method of restoring computer data includes detecting a block of a storage volume that is being modified by a write operation to a file. An original content of the block is read before the block is modified. The original content is stored in another block prior to providing the original content of the block to a cloud storage over the Internet. The original content of the block is retrieved from the cloud storage over the Internet. The original content is written back to the block to restore the storage volume.

In another embodiment, a method of restoring computer data comprises initiating a first snapshot in a computer at a first point in time. Modification of a block of a storage volume in the computer is detected at a second point in time after the first point in time. An original content of the block is stored in the first snapshot in a cloud storage that is remotely located from the computer. The first snapshot is retrieved from the cloud storage to restore the storage volume. The original content is copied from the first snapshot back into the block of the storage volume to restore the storage volume.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
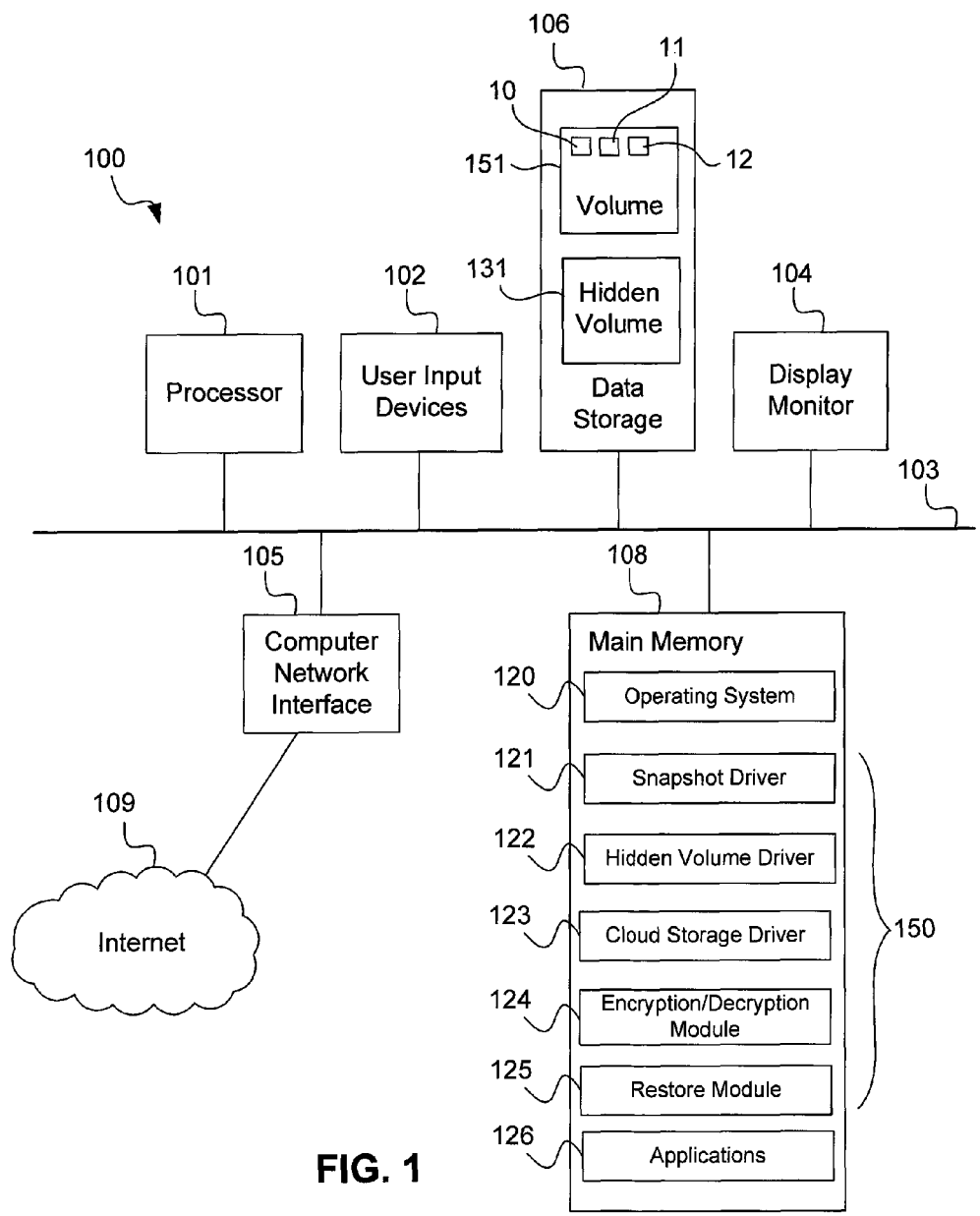
FIG. 1 shows a schematic diagram of a computer in accordance with an embodiment of the present invention.

Referring now to FIG. 1, there is shown a schematic diagram of a computer 100 in accordance with an embodiment of the present invention. In one embodiment, the computer 100 is a personal computer (e.g., desktop, laptop) employed by a home computer user. The computer 100 may have fewer or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory, non-volatile memory, RAM drive), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 is a particular machine as programmed with software modules, which in the example of FIG. 1 comprise an operating system 120, a snapshot driver 121, a hidden volume driver 122, a cloud storage driver 123, a block level encryption/decryption module 124, a restore module 125, and applications 126. The software modules comprise computer-readable program code stored non-transitory in the main memory 108 for execution by the processor 101. The computer 100 may be configured to perform its functions by executing the software modules. The software modules may be loaded from the data storage device 106 to the main memory 108. The software modules may also be made available in other computer-readable medium including optical disk, flash drive, and other memory devices.

In one embodiment, the operating system 120 of the computer 100 comprises the Microsoft Windows™ operating system. The snapshot driver 121, the hidden volume driver 122, the cloud storage driver 123, the block level encryption/decryption module 124, and the restore module 125 are part of a cloud-based back up and restore module 150. In one embodiment, the backup and restore module 150 is configured to generate point-in-time snapshots that are stored in a remotely located, i.e. external from the computer 100, cloud storage 200 (see FIG. 2).

In the example of FIG. 1, a data storage device 106 is configured to have a hidden volume 131 and a storage volume 151. The computer 100 may also include additional volumes. In the example of FIG. 1, the hidden volume 131 and the storage volume 150 are disk volumes but may also be other storage volumes depending on the type of the data storage device 106. The storage volume 151 may have a plurality of blocks, such as a block 10, block 11, block 12 etc. Like the storage volume 151, the hidden volume 131 may also be organized in blocks. A volume represents accessible storage space in one or more data storage devices. The hidden volume 131 is so named because, unlike the typical storage volume 151, the hidden volume 131 is not directly accessible to the user, i.e., a hidden storage volume. This prevents user applications and other components not associated with the backup and restore module 150 from accessing contents of the hidden volume 131.

Figure 2:
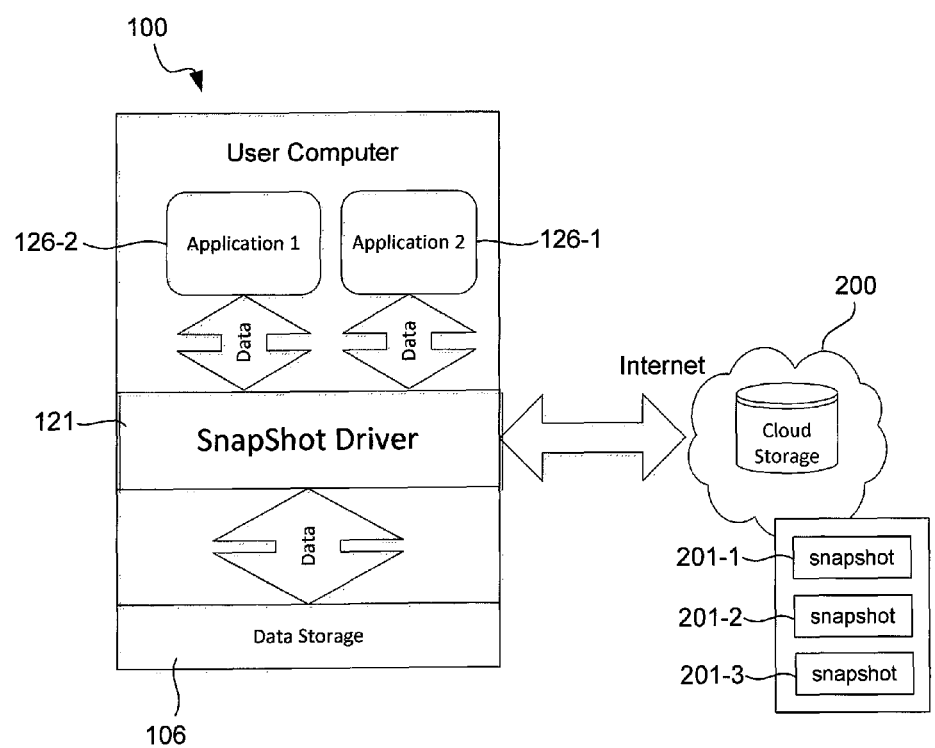
FIG. 2 schematically illustrates the operation of the computer for backup and restore in accordance with an embodiment of the present invention.

FIG. 2 schematically illustrates the operation of the computer 100 for backup and restore in accordance with an embodiment of the present invention. In the example of FIG. 2, the computer 100 is running a plurality of applications 126 (i.e., 126-1, 126-2, . . . ). An application 126 may comprise an application program that reads and writes data to the data storage device 106. In one embodiment, the snapshot driver 121 is configured to detect and intercept a write operation to the data storage device 106, keep track of changes to data blocks of a volume of the data storage device 106 brought about by the write operation, and store original contents of affected data blocks in the cloud storage 200 as a point-in-time snapshot 201 (i.e., 201-1, 201-2, 201-3, . . . ). The snapshot driver 121 then passes the write operation to be written to the data storage device 106.

Each point-in-time snapshot 201 is so named because it indicates original contents of blocks of a volume of the data storage device 106 at a particular point in time. As an example, the snapshot 201-1 may indicate original contents of blocks of the volume at a first point in time (e.g., Jan. 3, 2011, at 3:01 PM EST), the snapshot 201-2 may indicate original contents of blocks of the volume at a second point in time after the first point in time (e.g., Jan. 4, 2011, at 9:35 AM EST), and the snapshot 201-3 may indicate original contents of blocks of the volume at a third point in time after the second point in time (e.g., Jan. 6, 2011, at 7:01 PM EST). In one embodiment, a snapshot contains original contents of only those blocks that have been modified since the snapshot was initiated. The user of the computer 100 may initiate a particular snapshot at any time and restore the volume to that particular snapshot. For example, the volume of the data storage device 106 may be restored back to the snapshot 201-2 to roll back the computer 100 to a previous configuration in the event the computer 100 started slowing down after installation of new software after the second point in time.

In the example of FIG. 2, the cloud storage 200 comprises a remotely located storage device accessible over the Internet. This protects the integrity of the snapshots 201 against corruption by viruses or data storage errors in the computer 100.

In one embodiment, the backup and restore module 150 creates a point-in-time snapshot 201 using a copy-on-write algorithm on a volume block level, instead of file level. As is well known, a block is a sequence of bits or bytes having a length referred to as a "block size." A file may be stored on a plurality of blocks. Block level snapshots are more efficient in terms of the amount of data that need to be kept compared to file level snapshots.

Figure 3:
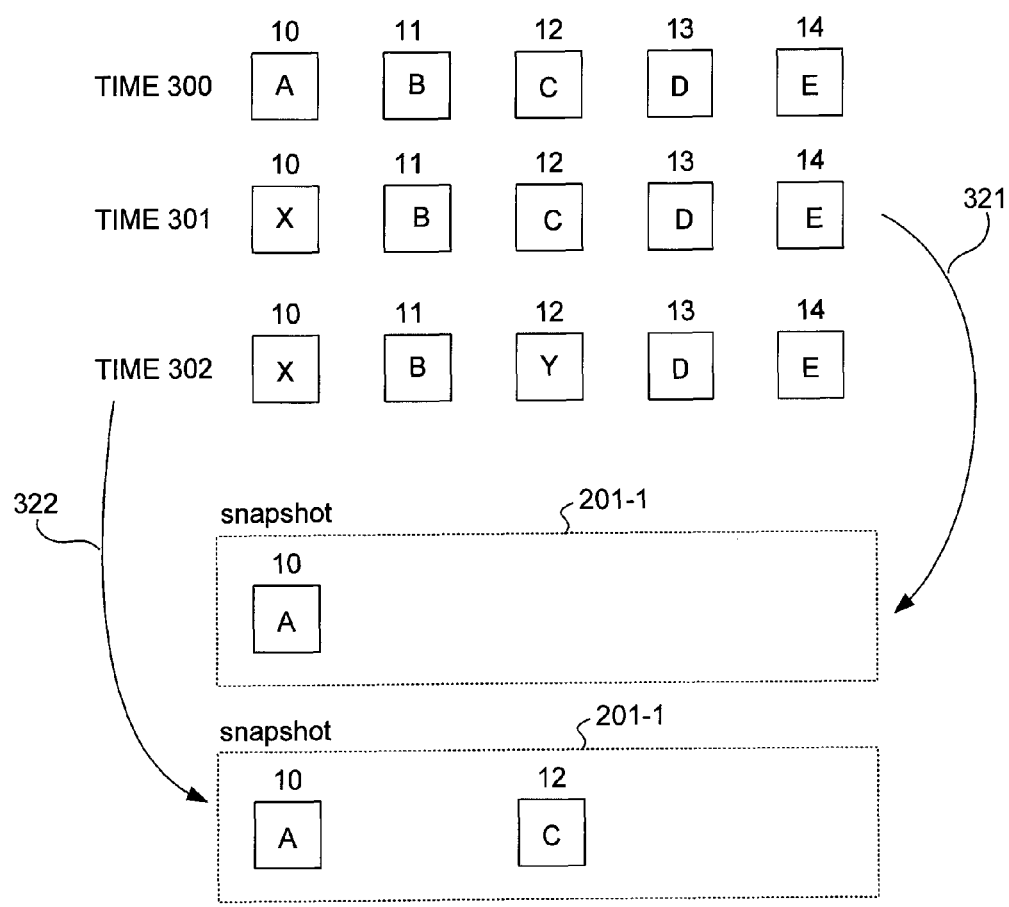
FIG. 3 schematically illustrates a copy-on-write algorithm that may be employed to create point-in-time snapshots.

FIG. 3 schematically illustrates a copy-on-write algorithm that may be employed to create the snapshots 201. In the example of FIG. 3, the time 300 represents a first point in time, the time 301 represents a second point in time after the first point in time, and the time 302 represents a third point in time after the second point in time. At the time 300 when the snapshot 201-1 is initiated, the storage volume 151 has the original contents "A" in block 10, "B" in block 11, "C" in block 12, "D" in block 13, and "E" in block 14. The storage volume 151 represents a storage area in one or more data storage devices 106. As can be appreciated, a storage volume has a plurality of blocks but only five are shown in FIG. 3 for clarity of illustration. The blocks 10-14 of the storage volume 151 are shown as containing alphabetical characters for illustration purposes only.

The snapshot 201-1 was initiated at the time 300, and has no data at the time 300 because the storage volume 151 has not been changed at that time. At the time 301, the application 126-1 writes to the storage volume 151 to change the contents of block 10 from "A" to "X". This results in the backup and restore module 150 indicating in the snapshot 201-1 the original contents of the block 10 at the time 300 (see arrow 321). At the time 302, the application 126-2 writes to the storage volume 151, changing the contents of the block 12 from "C" to "Y". Accordingly, the backup and restore module 150 indicates in the snapshot 201-1 the original contents of the block 12 at the time 300. To restore the storage volume 151 to a particular point in time, e.g., to roll back the computer 100 to a previous configuration, the backup and restore module 150 simply writes back the original contents noted in the snapshot to corresponding blocks. For example, to restore the storage volume 151 back to the time 300 at the time 302, the backup and restore module 150 writes back "A" to the block 10 and "C" to the block 12 as indicated in the snapshot 201-1 at the time 302 (see arrow 322). The backup and restore procedure may be performed for all volumes in the computer 100.

In summary, when a block is modified, the backup and restore module 150 updates the snapshot 201-1 to indicate the original contents of the block at the time the snapshot was initiated. The snapshot 201-1 does not necessarily need to include the contents of all blocks of the storage volume, but only those that have been changed since the time the snapshot 201-1 has been initiated. Furthermore, subsequent changes to a block that has been modified after the snapshot 201-1 was initiated do not need to be tracked. These features minimize the amount of data that have to be transmitted to the cloud storage 200.

Figure 4:
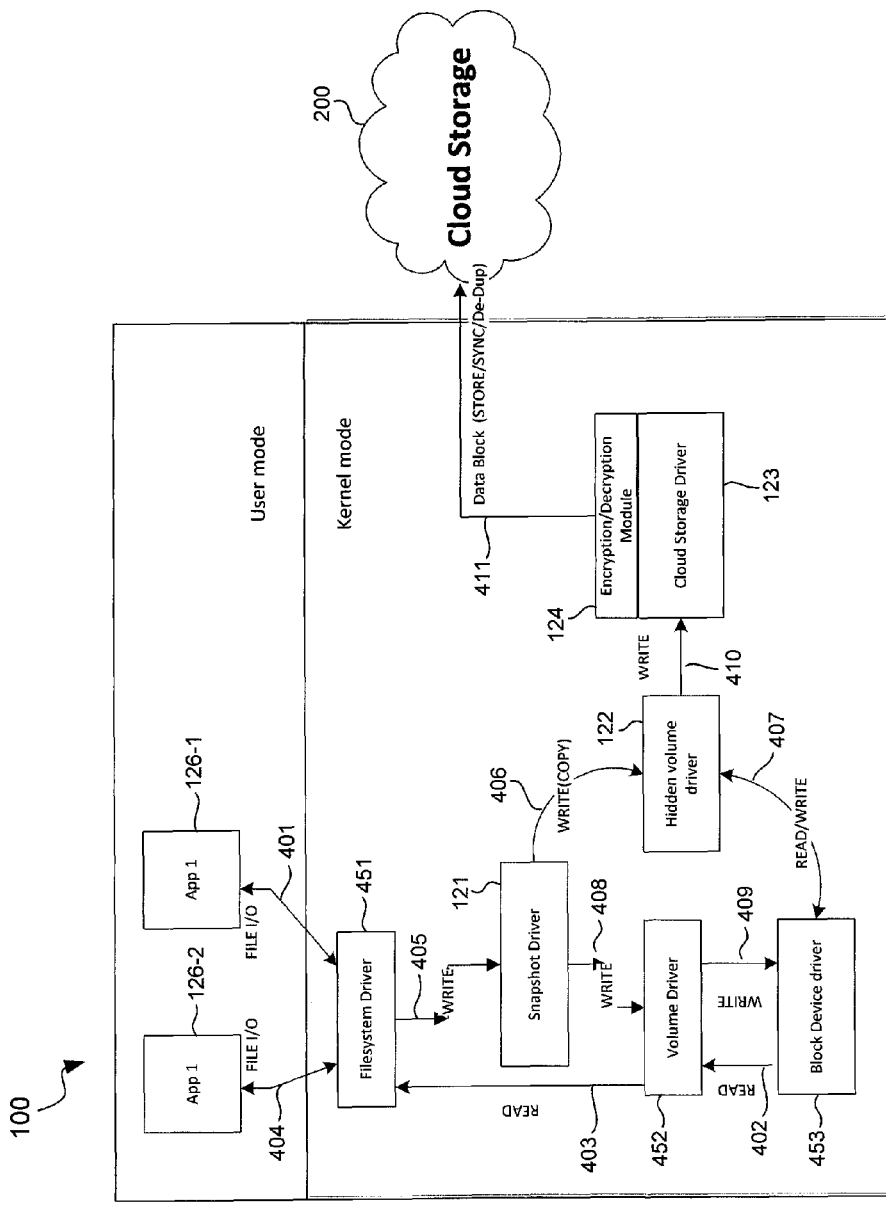
FIG. 4 shows a flow diagram schematically illustrating a method of backing up a storage volume in accordance with an embodiment of the present invention.

FIG. 4 shows a flow diagram schematically illustrating a method of backing up a storage volume in accordance with an embodiment of the present invention. In the example of FIG. 4, the applications 126 comprise application programs and are thus running in user mode. The other modules shown in FIG. 4 are running in kernel mode. In the example of FIG. 4, a file system driver 451, a volume driver 452, and a block device driver 453 are part of the operating system 120 (see FIG. 1).

In an example operation, the application 126-1 performs a file I/O (input/output) operation (see arrow 401) to read a file from the data storage device 106 (not shown). The block driver 453 reads the contents of the blocks comprising the file, and provides them to the volume driver 452 (see arrow 402). The volume driver 452 receives the contents of the blocks and provides them to the file system driver 451 (see arrow 403), which in turn forms the contents of the blocks into the requested file and provides the file to the requesting application 126-1 (see arrow 401).

In the example of FIG. 4, a point-in-time snapshot 201 was started just before the application 126-1 performed the file I/O to read the file. However, the snapshot 201 is not affected by the read operation because a read operation does not involve changing the contents of a block. Subsequently, the application 126-2 performs a file I/O to write to a file (see arrow 404). The write operation is received by the file system driver 451.

In one embodiment, the snapshot driver 121 is configured to detect and intercept a file I/O that changes the contents of one or more blocks in a storage volume. For example, the snapshot driver 121 may use the Microsoft Windows™ operating system filtering techniques to receive file write operations from the file system driver 451. The file system driver 451 passes the write operation, including the blocks affected by the write operation and the volume where the blocks belong, to the snapshot driver 121 (see arrow 405).

In one embodiment, the backup and restore module 150 generates a point-in-time snapshot 201 using a volume block level copy-on-write algorithm. Accordingly, the snapshot driver 121 determines whether or not the write operation changes original contents of the blocks of the storage volume, with the original contents being the contents of the blocks at the point in time the snapshot 201 was initiated. The snapshot driver 121 then provides a copy of the write operation to the hidden volume driver 122 (see arrow 406). The snapshot driver 121 also informs the hidden volume driver 122 whether or not the write operation changes original contents. For each block which original content is being modified for the first time since the snapshot 201 was initiated, the hidden volume driver 122 reads the original contents of the blocks from the block device driver 453 (see arrow 407). The original contents of the blocks being modified are also referred to as "snapshot data" as they will be included in the snapshot 201 stored in the cloud storage 200. After the hidden volume driver 122 retrieves original contents of blocks affected by the write operation, the hidden volume driver 122 so informs the snapshot driver 121, which then proceeds to effect the write operation by passing the write operation to the volume driver 452 (see arrow 408). The volume driver 452 then instructs the block device driver 453 to modify the blocks affected by the write operation (see arrow 409).

In one embodiment, the hidden volume driver 122 is configured to detect whether or not a communication link may be established to the cloud storage 200. For example, the hidden volume driver 122 may be configured to detect whether the user computer 100 has an Internet connection and the cloud storage 200 is operational to receive snapshot data from the computer 100. When a communication link cannot be established to the cloud storage 200, the hidden volume driver 122 is configured to write the snapshot data, i.e., the original contents of blocks being modified, to the hidden volume 131 (see FIG. 1) using the block device driver 453 (see arrow 407). This allows the point-in-time backup procedure to continue during times when there is no Internet connection to the cloud storage 200. The hidden volume driver 122 retrieves the snapshot data from the hidden volume 131 for storage in the cloud storage 200 once communication is established to the cloud storage 200.

When communication can be established to the cloud storage 200, the hidden volume driver 122 provides the snapshot data and any other information for creating the snapshot 201 to the cloud storage 200 (see arrows 410 and 411). For security purposes, each individual block (i.e., on a block level) in the snapshot data may be encrypted by the block level encryption/decryption module 124 before the snapshot data are provided to the cloud storage 200. The cloud storage 200 writes the encrypted original contents of the blocks affected by the write operation in the snapshot 201. Snapshot data synchronization between the hidden volume driver 122 and the cloud storage 200 may optionally include a de-duplication component to reduce traffic between the computer 100 and the cloud storage 200.

Figure 5:
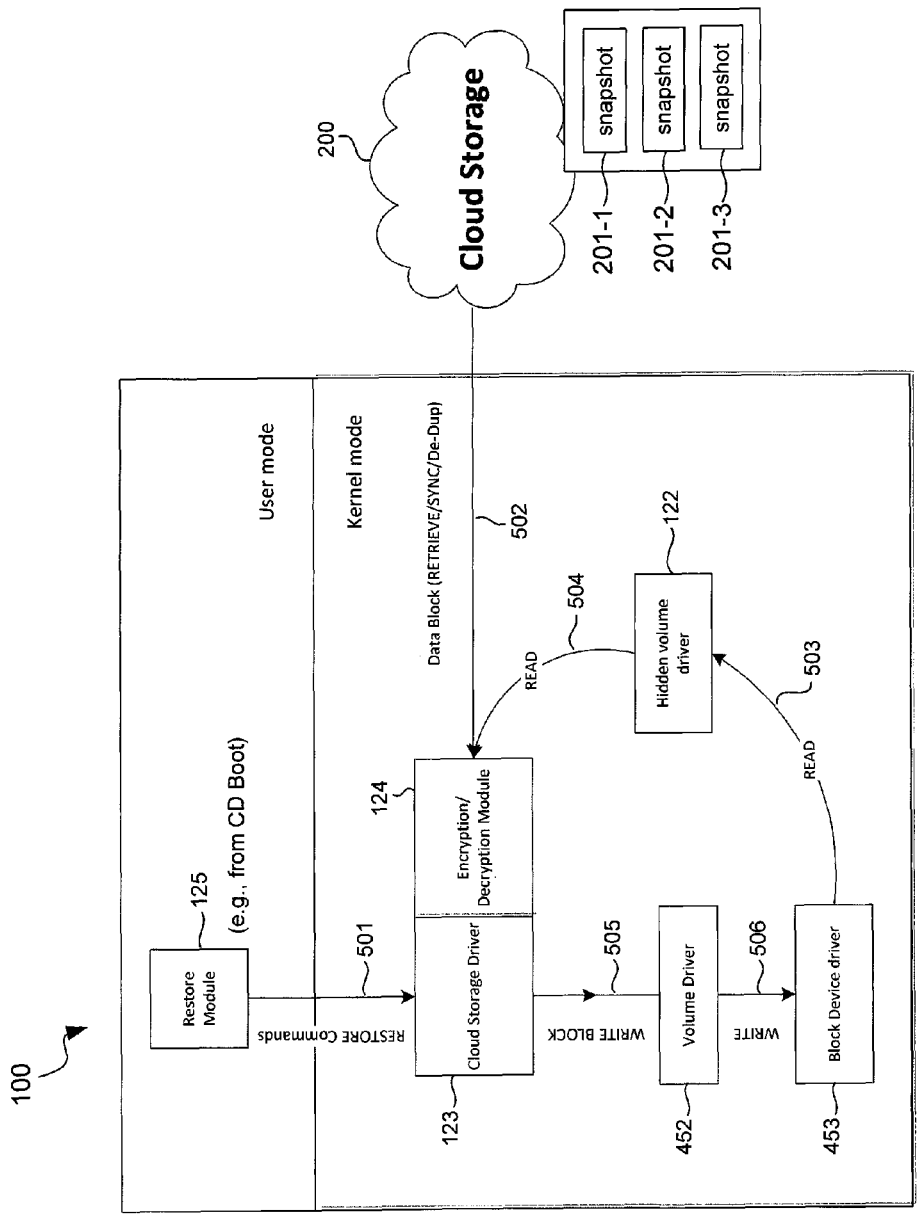
FIG. 5 shows a flow diagram schematically illustrating a method of restoring a storage volume using a block level point-in-time snapshot in accordance with an embodiment of the present invention.

FIG. 5 shows a flow diagram schematically illustrating a method of restoring a storage volume using a point-in-time snapshot in accordance with an embodiment of the present invention. In the example of FIG. 5, the restore module 125 is running in user mode. The other modules shown in FIG. 5 are running in kernel mode.

The restore module 125 may be configured to allow a storage volume to be restored to a previous point in time using a particular snapshot 201. This allows the user to roll back the computer 100 to a previous, known good configuration. For example, the computer 100 may be rolled back to a particular point in time using a corresponding point-in-time snapshot 201 to bring back the computer 100 to a state before virus infection or installation of suspicious software that modified blocks of the disk volume 151. The computer 100 may be rolled back by restoring the disk volume 151 to include original contents that existed before the virus infection or installation of the suspicious software.

The restore module 125 may be included in a bootable media, such as a bootable compact disk, to allow the restore module 125 to be executed even when the computer 100 cannot be booted normally (e.g., due to corruption). In that embodiment, the other components of the backup and restore module 150 (see FIG. 1) and relevant components of the operating system 120 may be included in the bootable media with the restore module 125.

The restore module 125 may be configured to present a user interface allowing for selection of a particular snapshot 201 to be used in restoring one or more storage volumes of the computer 100. The restore module 125 issues a command to the cloud storage driver 123 to retrieve the selected snapshot 201, which in this example may be the snapshot 201-1 (see arrow 501). In response, the cloud storage driver 123 retrieves the snapshot 201-1 from the cloud storage 200 (see arrow 502). The block level encryption/decryption module 124 decrypts encrypted blocks included in the snapshot 201.

In one embodiment, the hidden volume driver 122 is configured to retrieve from the hidden volume 131 by way of the block device driver 453 (see arrow 503) any snapshot data yet to be provided to the cloud storage 200 but form a part of the snapshot 201-1. For example, the hidden volume driver 122 may communicate with the cloud storage driver 123 to determine that the snapshot 201-1 is selected for the restore procedure and search the hidden volume 131 for snapshot data yet to be included in the selected snapshot 201-1. The hidden volume driver 122 provides these snapshot data to the cloud storage driver 123 (see arrow 504).

The cloud storage driver 123 receives the snapshot 201-1, including updates from the hidden volume driver 122, and proceeds to write back the original contents of the blocks indicated in the snapshot 201-1. The cloud storage driver 123 may do so by providing the original contents and their respective block addresses to the volume driver 452 (see arrow 505), which in turn commands the block device driver 453 to restore the corresponding blocks back to their original contents (arrow 506).

Methods and system for cloud-based point-in-time restore of computer data have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of restoring computer data, the method comprising: receiving original contents of blocks of a storage volume that have been modified by a write operation in a computer;
storing the original contents in a hidden volume of a data storage device in the computer, the hidden volume not directly accessible by user applications;
determining whether or not communication can be established with a remotely located cloud storage; in response to detecting that communication can be established with the cloud storage, providing the original contents from the computer to the cloud storage over the Internet;
receiving a command to roll back the computer to a previous configuration;
in response to receiving the command to roll back the computer, retrieving the original contents from the cloud storage and into the computer over the Internet;
writing the original contents back to corresponding blocks in the storage volume; and
booting a bootable media to run a restore module, wherein the restore module initiates retrieval of the original contents from the cloud storage.

2. The method of claim 1 further comprising:
encrypting each of the original contents on a block level before sending the original contents to the cloud storage.

3. A method of restoring computer data, the method comprising:
detecting a block of a storage volume that is being modified by a write operation to a file;
reading an original content of the block before the block is modified;
storing the original content in another block prior to providing the original content of the block to a cloud storage over the Internet;
retrieving the original content of the block from the cloud storage over the Internet;
restoring the storage volume by writing back the original content to the block.

4. The method of claim 3 wherein the other block is in a hidden volume of a same computer as the storage volume.

5. The method of claim 4 further comprising:
retrieving other original contents from the hidden volume and writing back the other original contents to corresponding blocks to restore the storage volume.

6. The method of claim 3 further comprising:
prior to providing the original content of the block to the cloud storage, determining whether or not a communication can be established with the cloud storage; and
providing the original content of the block to the cloud storage in response to detecting that communication can be established with the cloud storage.

7. The method of claim 3 further comprising:
encrypting the original content of the block prior to providing the original content of the block to the cloud storage.

8. The method of claim 7 further comprising:
decrypting the original contents of the block as received from the cloud storage before writing back the original content to the block to restore the storage volume.

9. A method of restoring computer data, the method comprising: initiating a first snapshot in a computer at a first point in time;
detecting modification of a block of a storage volume in the computer at a second point in time after the first point in time;
storing an original content of the block in the first snapshot in a cloud storage that is remotely located from the computer;
retrieving the first snapshot from the cloud storage to restore the storage volume;
restoring the storage volume by copying the original content from the first snapshot back into the block of the storage volume; and
wherein the first snapshot is created using a block level copy-on-write algorithm.

\* \* \* \* \*